United States Patent [19]
Wu-Chen

[11] Patent Number: 5,720,384
[45] Date of Patent: Feb. 24, 1998

[54] LASER RECORD PROTECTION FOLDER

[76] Inventor: Su-Hsiang Wu-Chen, No. 40-1, Lane 47, Sec. 1, Shui-Yuan St., Tan-Shui Town, Taipei Hsien, Taiwan

[21] Appl. No.: 668,303

[22] Filed: Jun. 25, 1996

[51] Int. Cl.⁶ .................................................. B65D 85/57
[52] U.S. Cl. ......................................... 206/308.1; 206/311
[58] Field of Search ................................. 206/303, 307, 206/308.1, 311, 312; 369/291

[56] References Cited

U.S. PATENT DOCUMENTS

| | | | |
|---|---|---|---|
| 5,396,987 | 3/1995 | Temple et al. | 306/312 |
| 5,501,987 | 3/1996 | Shuhsiang | 206/308.1 |

*Primary Examiner*—Jimmy G. Foster
*Attorney, Agent, or Firm*—W. Wayne Liauh

[57] ABSTRACT

An improvement of laser record protection folder over U.S. Pat. No. 5,501,326. There is a rectangular shape bag element for holding either a laser record or an index printing. A "Y"-shape dividing line and a slot opening are formed in one of the two pieces of the bag element to facilitate the insertion or removal of the laser record or index printing. The dividing line forms a sealed envelope on the bag element and thus can prevent the recording surface of the laser record from smearing by user's hand or ambient dust and dirt.

6 Claims, 3 Drawing Sheets

LASER RECORD PROTECTION FOLDER

BACKGROUND OF THE INVENTION

This invention relates to a laser record protection folder and is an improvement of the laser record protection folder disclosed by the applicant in U.S. Pat. No. 5,501,326. In the disclosure of U.S. Pat. No. 5,501,326, the bag element has a semi-circular shaped outer end. There is also a Y-shaped slot formed on the top piece of the bag element to facilitate the insertion or removal of a laser record. The recording surface of the laser record is prone to smearing by user's hand or ambient dust and dirt. Furthermore the loose-leaf fastener of binding rings and locking lugs, although practical for use, is costly to produce. There is still room for improvement.

SUMMARY OF THE INVENTION

It is therefore an object of the present invention to provide a laser record protection folder which has a substantially square shape bag element for containing a laser record or a record index printing.

It is another object of the present invention to provide a laser record protection folder containing a bag element which has a Y-shape dividing line and a substantially circular central opening forming a sealed envelope to facilitate the insertion or removal of a laser record but protecting the laser recording surface from smearing by user's hand or ambient dust and dirt.

It is a further object of the present invention to provide a laser record protection folder which uses a plastic clamping member as the loose-leaf fastener for reducing cost and enhancing economic value.

DETAILED DESCRIPTION

Figure 1:
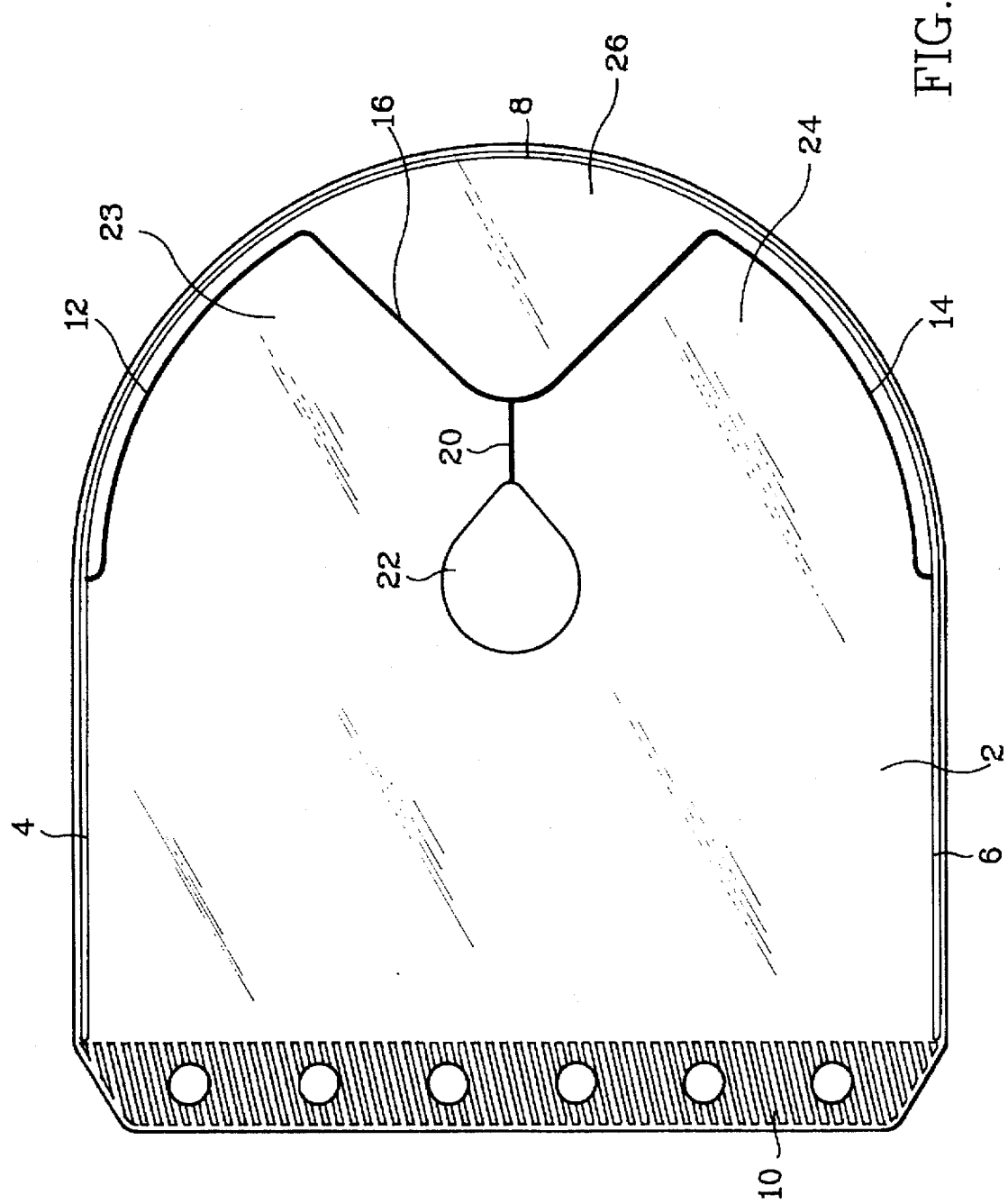
FIG. 1 is a plan view of an embodiment of a bag element of the present invention.

Referring to FIG. 1 for an embodiment of a bag element of the present invention, a bag element 2 has generally a shape like the one disclosed in U.S. Pat. No. 5,501,326 with four sealed edges 4, 6, 8 and 10. But instead of a Y-shape slot, there is a upper dividing line 12 and a lower dividing line 14 spacedly formed along the rim of the semi-circular sealed edge 8 of the top piece (or bottom piece) of the bag element 2. The upper dividing line 12 and the lower dividing line 14 are connected by a "<"-shape dividing line 16 located therebetween. There is further a linear and central dividing line 20 connecting at one end with the converging end of the "<"-shape dividing line 16 to form a substantially "Y"-shape dividing line thereof. Another end of the central dividing line 20 connects with a slot opening 22 located near the center of the bag element 2. The dividing lines set forth above thus form an upper flap 23, a lower flap 24 and a central flap 26. The upper flap 23 and lower flap 24 allow a laser record to insert into or remove from the bag element 2. Once a laser record is held in a bag element 2, the central flap 26 can be used to prevent the laser record from slipping out of the bag element 2.

Figure 2:
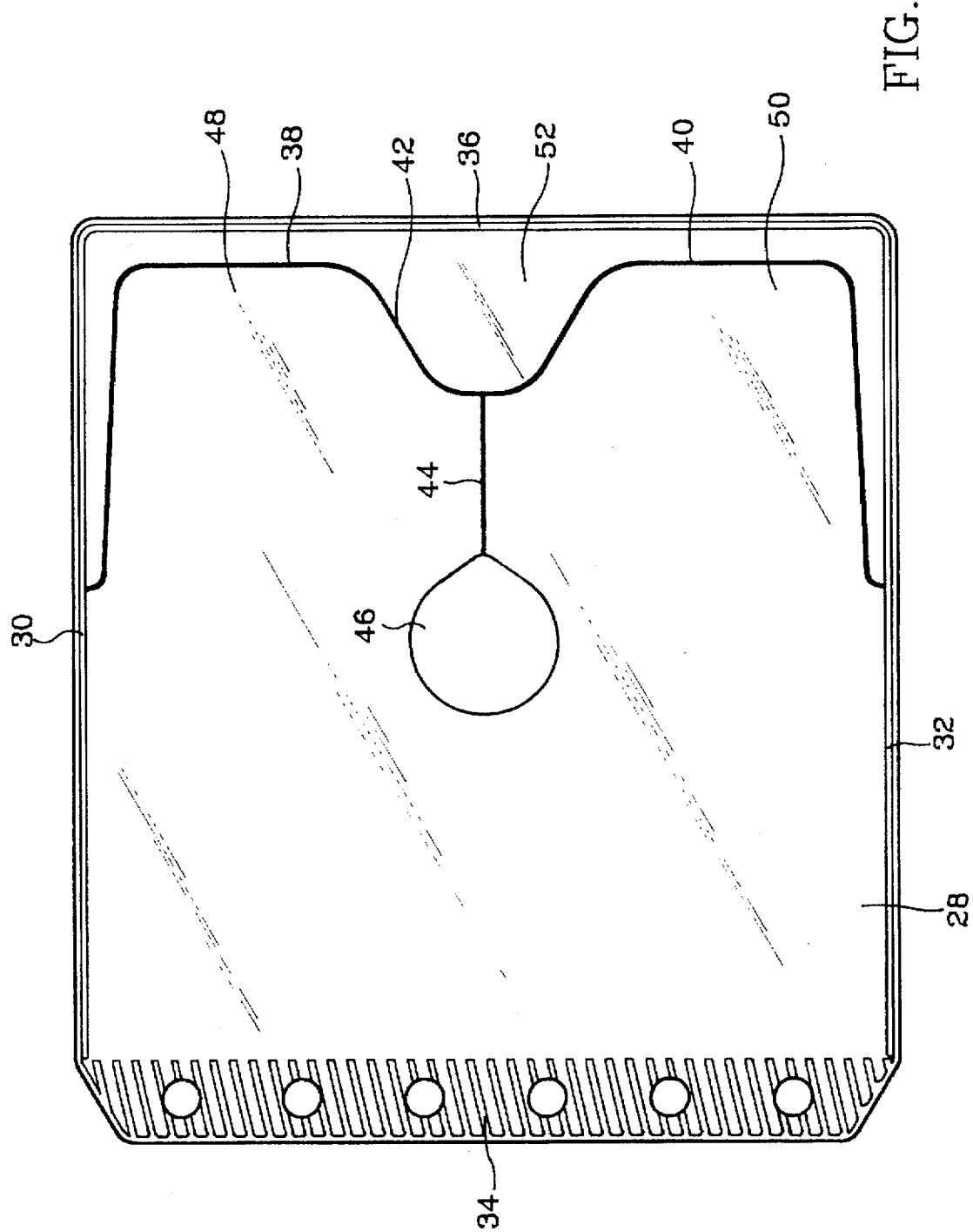
FIG. 2 is a plan view of another embodiment of a bag element of the present invention.

FIG. 2 illustrates another embodiment of a bag element of the present invention. It generally has similar structure like the one shown in FIG. 1 except that it has a substantially square-shaped bag element 28 which includes a top piece and a bottom piece. The first sealed edge 30 and the second sealed edge 32 are substantially in parallel. The third sealed edge 34 located on the inner end of the bag element has a plurality of binding holes formed therein to engage with the loose-leaf fastener. On the outer end of the bag element 28, there is a fourth sealed edge 36. Along the fourth sealed edge 36, there is a top dividing line 38 and a bottom dividing line 40 spacedly formed in the top piece of the bag element 28. There is a second substantially "<" shape dividing line 42 in the top piece of the bag element 28 to connect the top diving line 38 and the bottom dividing line 40. There is also a linear and second central dividing line 44 connecting at one end with the converging end of the second "<"-shape dividing line 42 to form a substantially "Y-shape" dividing line thereof. Another end of the second central dividing line 44 connects with a second slot opening 46 located near the center of the top piece of the bag element 28. The dividing lines set forth above thus form a top flap 48 and a bottom flap 50 to allow a laser record or an index printing be inserted into or be removed from the bag element 28. The protrusive flap 52 in the middle can prevent the laser record or the index printing held in the bag element 28 from slipping out.

Figure 3:
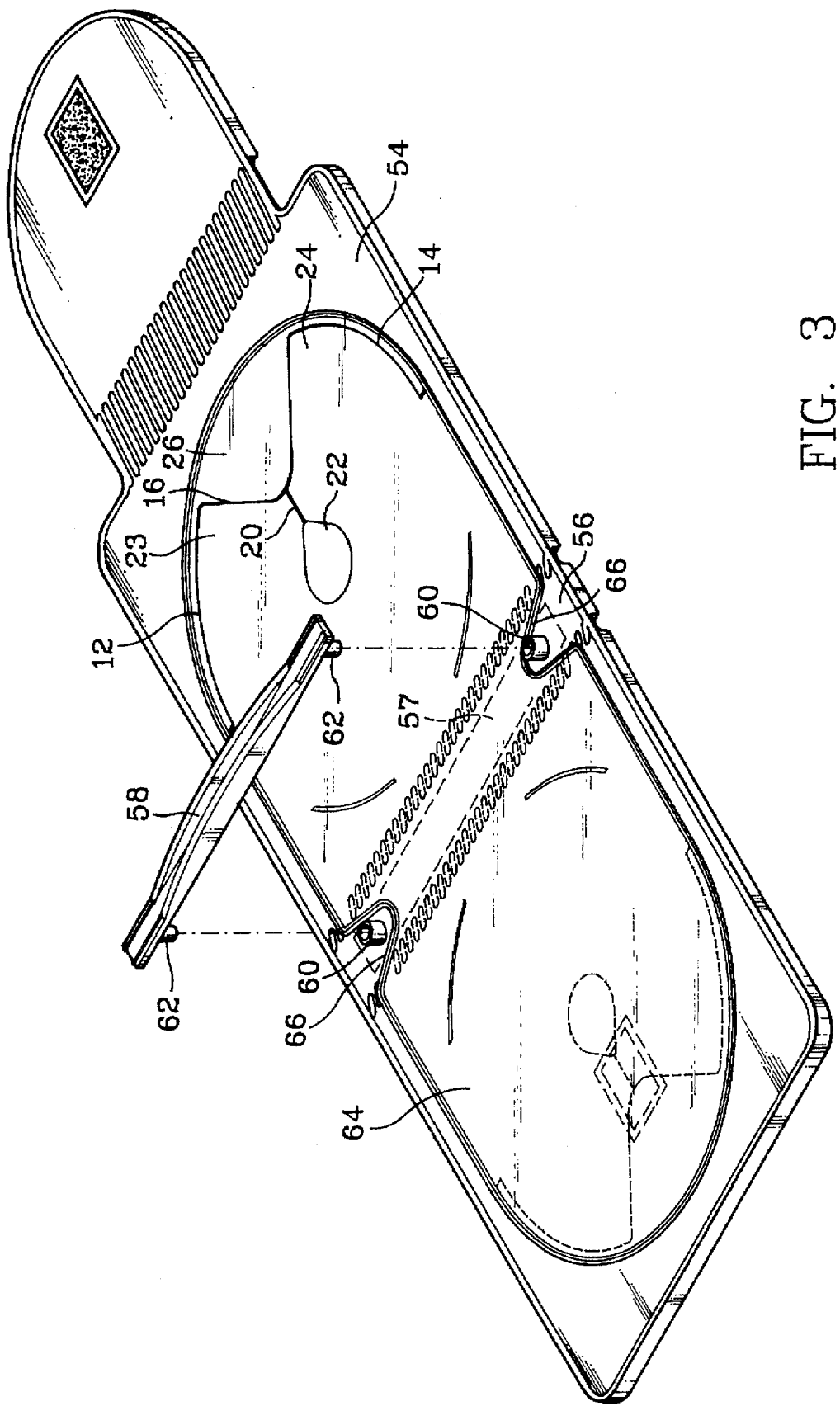
FIG. 3 is a perspective view of the inner structure of the present invention.

FIG. 3 illustrates the inner structure of the present invention. The outer cover 54 of the protection folder generally has similar structure like the one disclosed in U.S. Pat. No. 5,501,326 except the followings. In the connection portion 56, there is provided a rectangular holding member 57 which has two hollow studs 60 located of two ends. There is a rectangular clamping member 58 about the same size of the holding member 57 and has two clamping pins 62 at two ends for engaging respectively with the hollow studs 60. The bag element 64 is composed of two bag bodies connecting together at the inner end. Each bag body is structured generally like a bag element shown in FIG. 1. However the dividing lines 12, 14, 16, 20 and slot opening 22 of one bag body of the bag element 64 are faced upward while the dividing lines and slot opening on another bag element are faced downward. There is a concave slot 66 formed at either end of the connecting inner end of the bag body to allow the stud-60 and the clamping pin 62 to pass through so that the clamping member 58 can hold the bag element 64 firmly upon the holding member 57.

Base on the description of the embodiments set forth above, it can be seen that the recording surface of the laser record can be prevented from smearing by hand contact or ambient dust and dirt. Besides holding a laser record, a rectangular bag element can also hold an index printing. The clamping type loose-leaf fastener and the structure of a bag element composed of two bag bodies can also significantly reduce the cost and price.

What is claimed is:

1. A laser record protection folder comprising;
   a bag element having two pieces sealed together around at least a semi-circular outer edge; wherein one of the two pieces having an upper dividing line and a lower dividing line respectively spaced from the semi-circular outer edge, said upper dividing line and said lower dividing line being connected by a substantially "<"-shape dividing line in the middle, a linear central dividing line connecting, at one end thereof, with the converging point of the "<"-shape dividing line, and a substantially circular slot opening connecting with the linear central line at another end thereof for forming an upper flap and a lower flap on the piece; and
   a loose-leaf fastener including a substantially rectangular holding member having two spaced hollow studs and a substantially rectangular clamping member with two spaced clamping pins for engaging respectively with the hollow studs and thus able to hold the bag element firmly with the holding member.

2. A laser record protection folder of claim 1, wherein the "<"-shape dividing line and the linear central dividing line form a substantially "Y"-shape dividing line.

3. A laser record protection folder of claim 1, wherein the bag element has a substantially rectangular shape.

4. A laser record protection folder of claim 1, wherein the bag element includes two connecting bag bodies that are integrally formed; each bag body having a substantially semi-circular center edge.

5. A laser record protection folder of claim 3, wherein the bag element includes two connecting bag bodies that are integrally formed; each bag body having a substantially rectangular shape.

6. A laser record protection folder of claim 4, wherein the two connecting bag bodies are connected with a connecting portion, which has a concave slot formed at each of it two ends.

* * * * *